United States Patent [19]

Ogawa

[11] Patent Number: 4,556,485

[45] Date of Patent: Dec. 3, 1985

[54] FILTER

[75] Inventor: Yonekichi Ogawa, Tokyo, Japan

[73] Assignee: Suisaku Kabushiki Kaisha, Tokyo, Japan

[21] Appl. No.: 636,475

[22] Filed: Jul. 31, 1984

[30] Foreign Application Priority Data

Feb. 20, 1984 [JP] Japan .................................. 59-29891

[51] Int. Cl.$^4$ ............................................. B01D 23/16
[52] U.S. Cl. .................................... 210/169; 210/291; 210/416.2
[58] Field of Search ............... 210/169, 266, 282, 289, 210/291, 293, 416.1, 416.2, 416.3

[56] References Cited

U.S. PATENT DOCUMENTS 2,676,921 4/1954 Vansteenkiste .................. 210/416.2

Primary Examiner—Ivars Cintins
Attorney, Agent, or Firm—Armstrong, Nikaido, Marmelstein & Kubovcik

[57] ABSTRACT

In a filter of the type in which at least part of a casing is buried with its suction ports in pebbles spread inside a water tank in order to let the pebbles exhibit a filter operation and suction means is connected to the casing, the improvement wherein the filter casing consists of a suction portion buried in the pebbles together with its suction ports, and a purification portion connected to the suction portion and having the upper part thereof closed by a detachable lid, a filter material dividing the purification portion into a purification chamber and a non-purification chamber and held by a frame member is removably fitted into the purification portion, and the suction means is supported by the lid in such a manner as to face the interior of the purification chamber.

6 Claims, 19 Drawing Figures

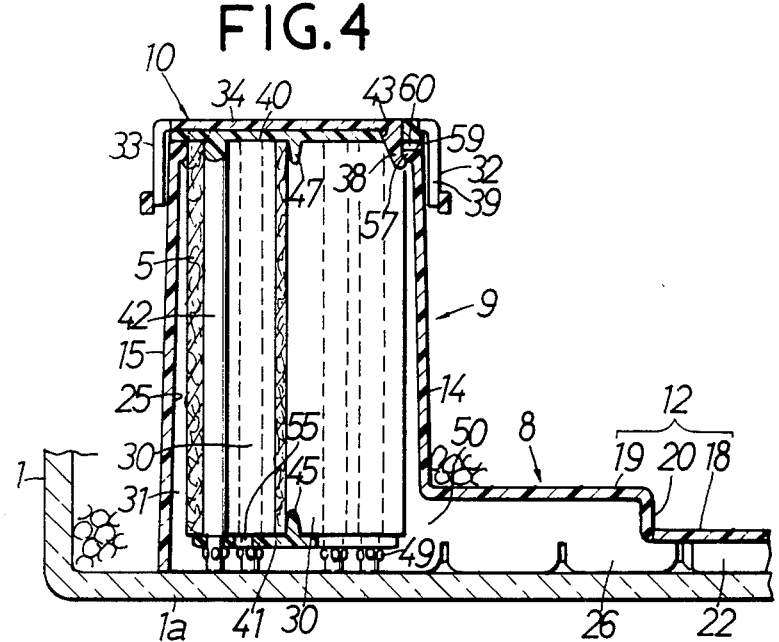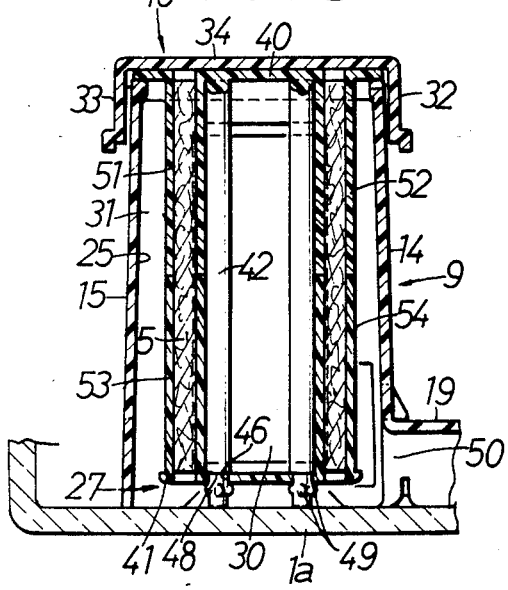

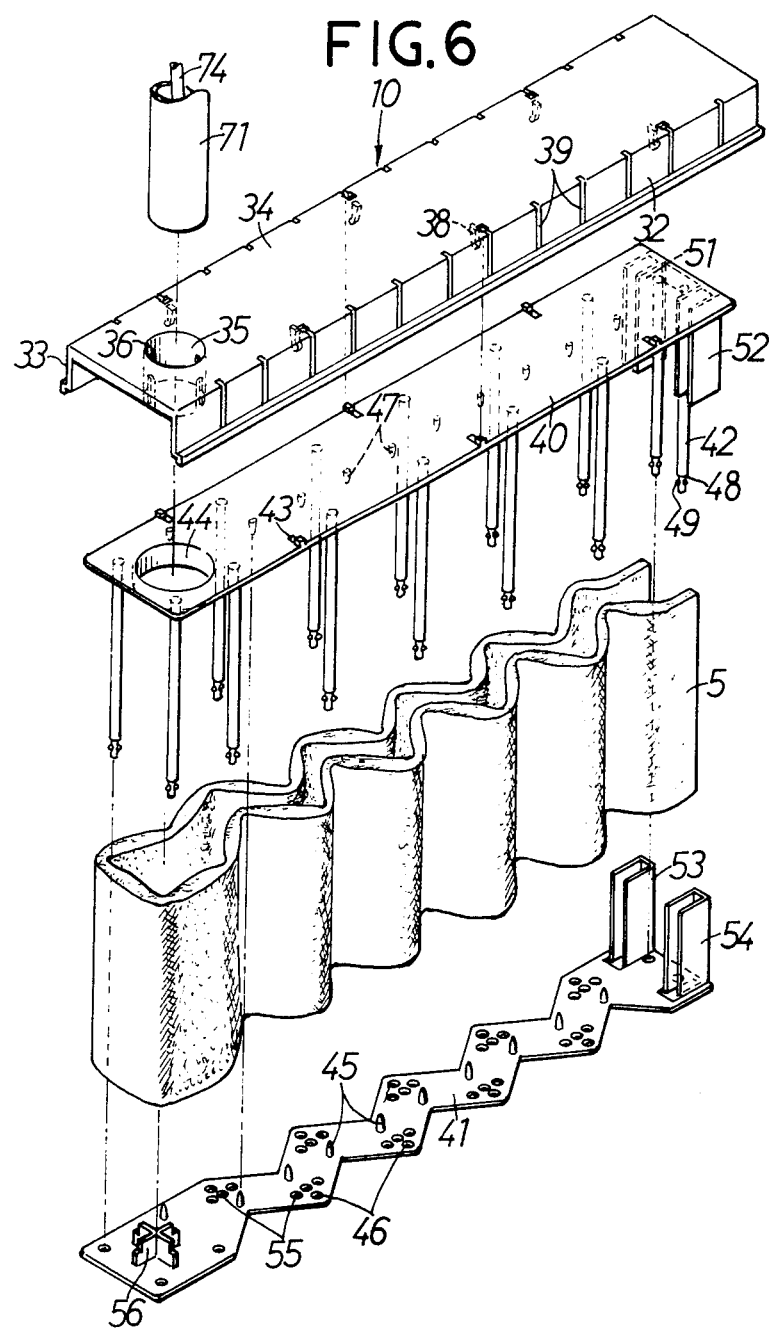

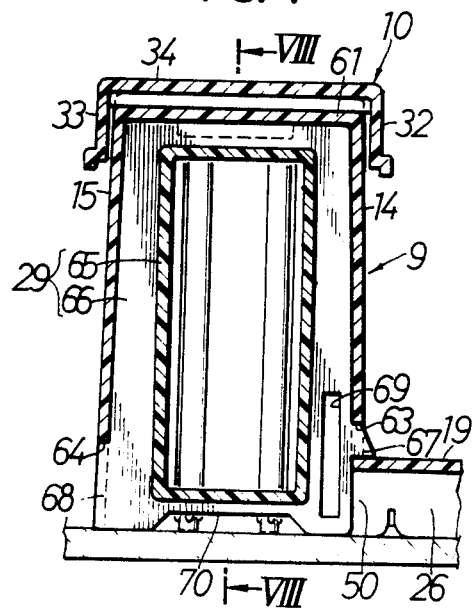
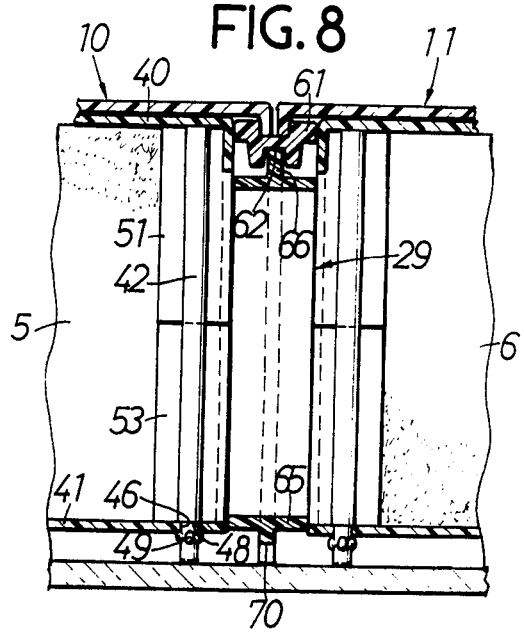

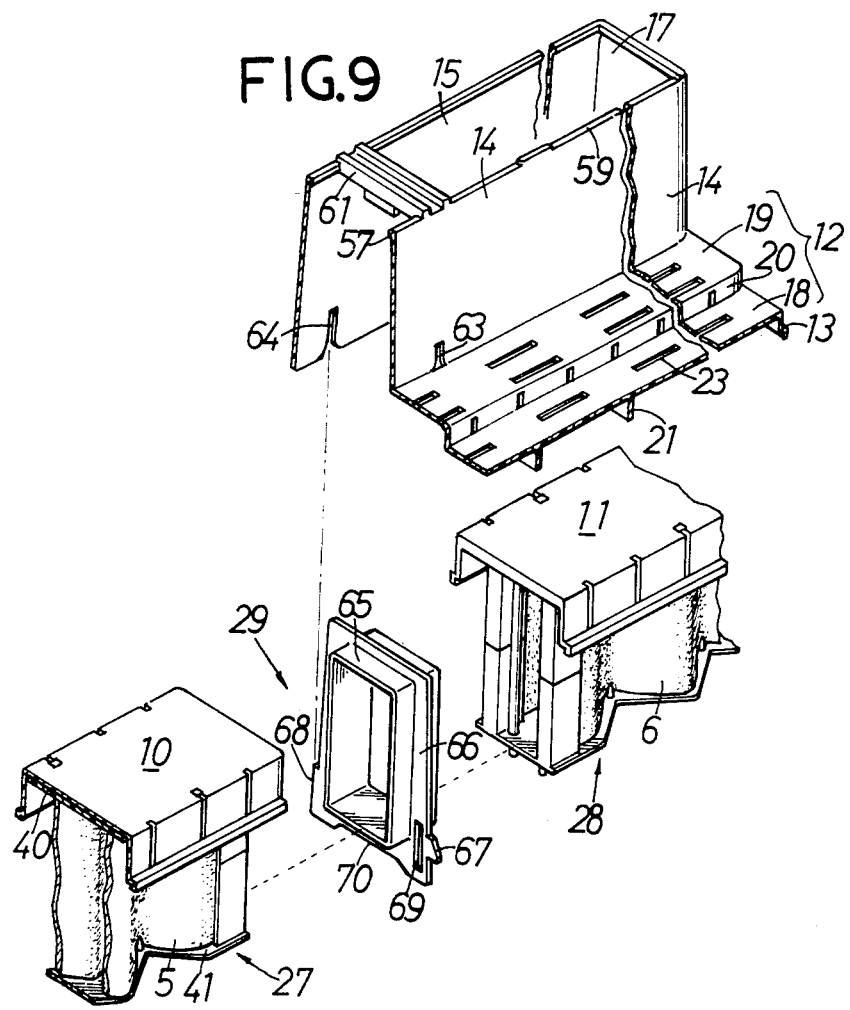

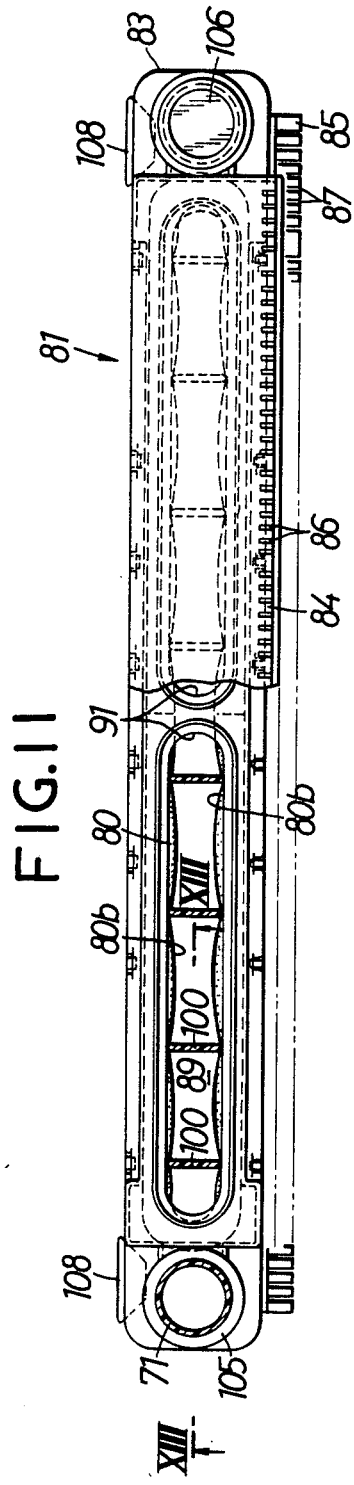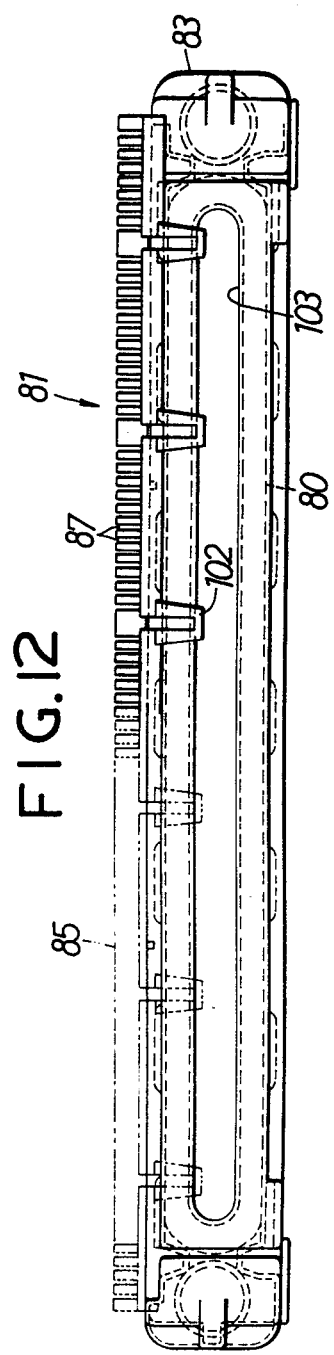

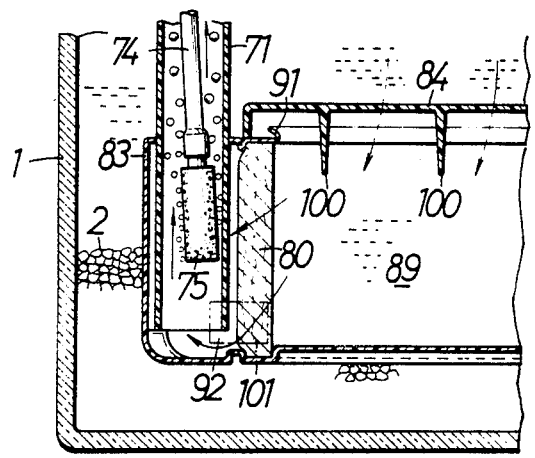

FILTER

BACKGROUND OF THE INVENTION

1. Field of the Invention

This invention relates to a filter, and more particularly to a filter of the type in which at least a part of a casing is buried together with its suction ports in pebbles spread inside a water tank in order to let the pebbles exhibit a filter operation, and suction means is connected to the casing.

2. Description of the Prior Art

A filter of the kind described above has been used generally as a so-called "bottom surface type" filter. The filter uses pebbles as a filter material and filtrates water by causing the water to flow from above to below through a layer of pebbles which are spread inside a water tank. In the filter of this kind, however, the filtration efficiency is low because the particle diameter of the pebbles is relatively great. Therefore, it is theoretically possible to further filtrate the water, that has once been filtrated by the pebbles, by use of a filter material to improve the filtration efficiency, but such a filter material involves the problem that it is likely to get clogged. Accordingly, it is desired to easily eliminate such clogging.

SUMMARY OF THE INVENTION

In order to obviate the problem described above, the present invention is directed to provide a filter which can improve the filtration efficiency and which makes it easy to carry out a cleaning operation of the filter to remove clogging.

To accomplish the object described above, in accordance with the present invention, a filter is provided, which comprises: a casing consisting of a suction portion which is buried in pebbles together with its suction ports, and a purification portion which is connected to the suction portion and whose upper part is closed by a detachable lid; a filter material which is held by a frame member and adapted to divide the purification portion into a purification chamber and a non-purification chamber, said filter material being removably inserted into the purification portion; and suction means supported by the lid in such a manner as to face the interior of the purification chamber.

With the construction described above, the water is filtrated by the pebbles and the filter material to improve the filtration efficiency. When the filter material gets clogged, it can be taken out extremely easily from the purification portion by opening the lid of the purification portion, and hence the cleaning operation to eliminate clogging matters can be made extremely easily.

The above and other objects, features and advantages of the present invention will become more apparent from the following description of some preferred embodiments thereof taken in conjunction with the accompanying drawings.

BRIEF DESCRIPTION OF THE DRAWINGS

FIGS. 1 through 9 illustrate a first embodiment of the present invention, wherein:

FIG. 1 is a perspective view of the principal portions of a filter;

FIG. 2 is a view as seen in a direction indicated by arrow II in FIG. 1;

FIG. 3 is a sectional view taken along line III—III in FIG. 2 and showing the state of the filter where it is placed inside a water tank;

FIG. 4 is a sectional view taken along line IV—IV of FIG. 2;

FIG. 5 is a sectional view taken along line V—V of FIG. 2;

FIG. 6 is an exploded perspective view showing a lid, a frame member and a filter material;

FIG. 7 is a sectional view taken along line VII—VII of FIG. 2;

FIG. 8 is a sectional view taken along line VIII—VIII of FIG. 7; and

FIG. 9 is an exploded perspective view showing the connecting relation between a connector and both filter materials.

FIGS. 10 through 19 illustrate another embodiment of the present invention, wherein:

FIG. 10 is a partly cut-away front view showing the state of the filter where it is placed inside the water tank;

FIG. 11 is a partly cut-away plan view of the filter;

FIG. 12 is its bottom view;

FIG. 13 is a sectional view taken along line XIII—XIII of FIG. 11;

FIG. 14 is a sectional view taken along line XIV—XIV of FIG. 10;

FIG. 15 is a sectional view taken along line XV—XV of FIG. 10;

FIG. 16 is a sectional view taken along line XVI—XVI of FIG. 10;

FIG. 17 is a sectional view taken along line XVII—XVII of FIG. 10;

FIG. 18 is a sectional view taken along line XVIII—XVIII of FIG. 10; and

FIG. 19 is a partly exploded perspective view of the filter.

DESCRIPTION OF THE PREFERRED EMBODIMENTS

Preferred embodiments of the invention will now be described with reference to the accompanying drawings.

Figure 1:
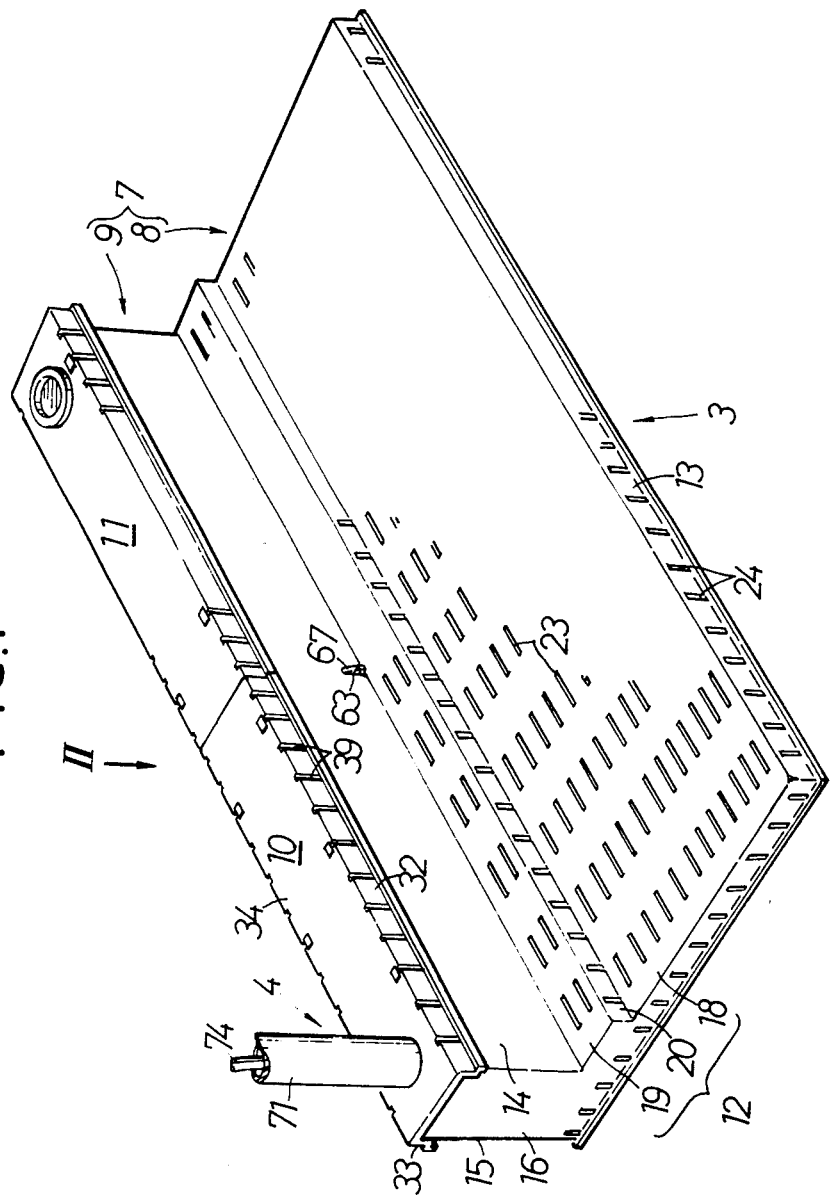
Figure 2:
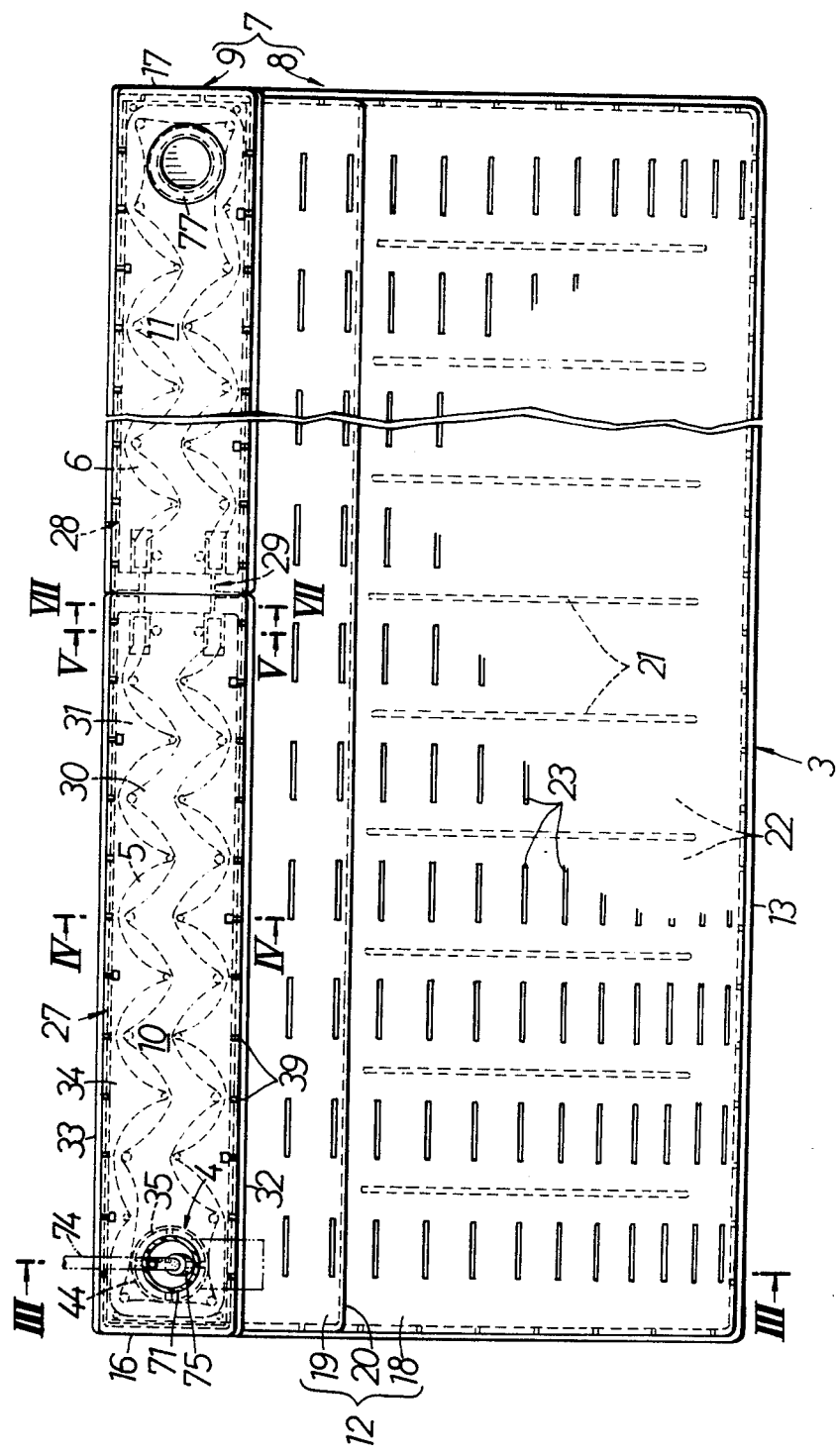
Figure 3:
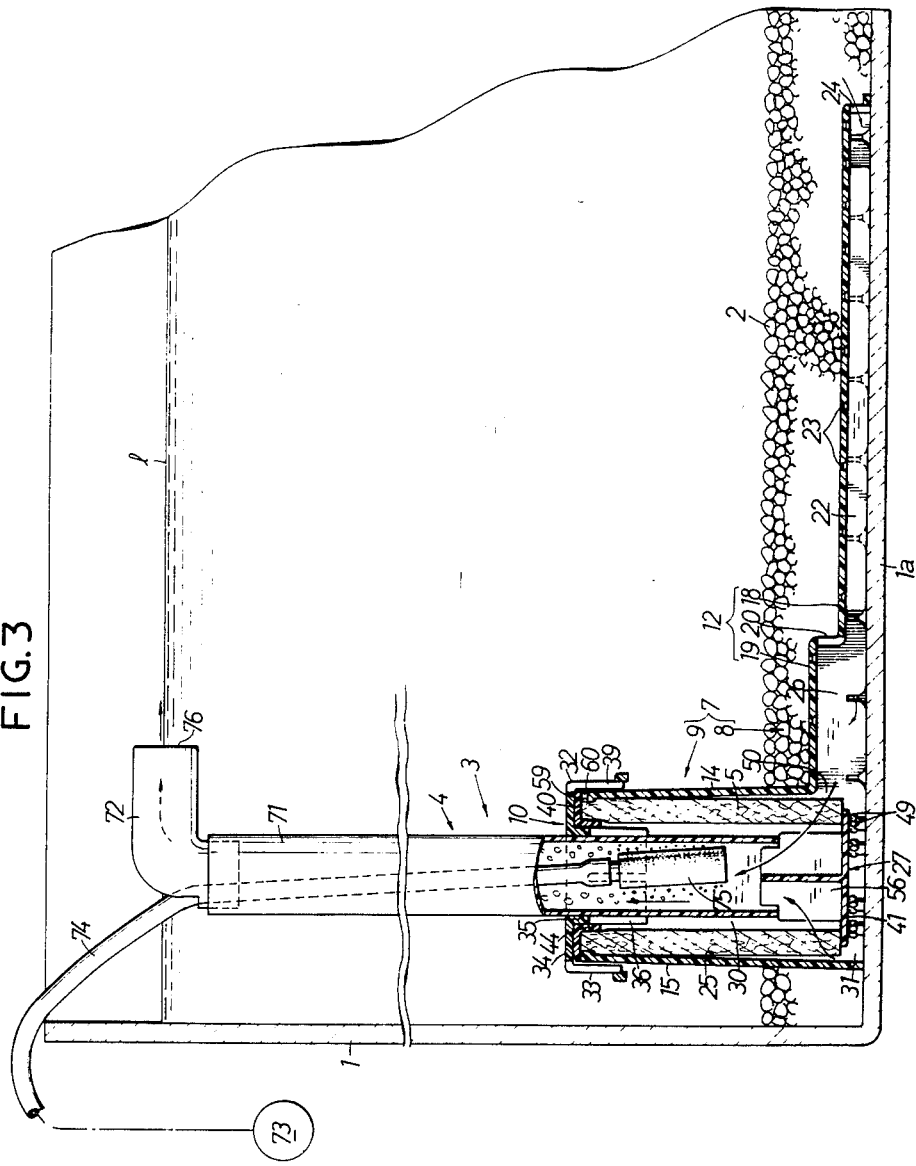

Referring initially to FIGS. 1, 2 and 3 illustrating a first embodiment of the invention, pebbles 2 is shown spread inside a water tank 1. A filter 3 of the invention is disposed at the bottom inside the water tank 1 with at least part thereof being embedded into the pebbles 2. With the filter 3 disposed inside the water tank 1, suction means 4 is operated so that the water inside the water tank 1 is sucked into the filter 3 through the pebbles 2. Sucked water is then filtrated by filter materials 5 and 6 and is thereafter sent back to the upper part of the water tank 1.

A casing 7 of the filter 3 consists of a flat box-shaped suction portion 8 having an open lower portion, and a rectangular tubular purification portion 9 upstanding vertically and having an upper portion thereof closed by a pair of lids 10 and 11. The suction portion 8 and the purification portion 9 are coupled in a unitary structure. The suction portion 8 consists of an upper wall 12 and a U-shaped side wall whose part on the side of the purification portion 9 is open. The purification portion 9 consists of a pair of side walls 14 and 15 opposing each other, and a pair of edge walls 16 and 17 opposing each other and connecting the edge portions of the side walls 14 and 15, respectively. The suction portion 8 is coupled at right angles to a connection port 50 defined at the lower part of the side wall 14. Accordingly, the casing 7 is shaped so that its longitudinal sectional shape becomes substantially L-shaped as a whole. Moreover, the suction portion 8 is relatively elongated both in a direction crossing at right angles to the side wall 14 of the purification portion 9 and in a direction extending horizontally along the side wall 14. The suction portion 8 is buried in the pebbles 2 over a relatively wide range.

An upper wall 12 of the suction portion 8 consists of a lower part 18 and a higher part 19 that are connected to each other via a step part 20, and the higher part 19 is coupled to the lower part of the side wall 14 of the purification portion 9. The lower part 18 extends a relatively long distance along the bottom 1a of the water tank 1, and a plurality of separators 21 extend in a direction perpendicular to the side wall 14 of the purification portion 9 and are suspended from the lower surface of the lower part 18 in parallel with one another in a spaced-apart relation. When the casing 7 is placed on the bottom 1a of the water tank 1, therefore, a plurality of parallel flow passages 22 are defined by the lower part 18, each separator 21, the bottom 1a of the water tank 1 and the side wall 13 of the suction portion 8.

A plurality of water suction ports 23 communicating with the flow passages 22 are formed at the lower part 18 of the suction portion 8 in the longitudinal direction along respective flow passages 22 in such a manner that the suction ports 23 are spaced from each other and the spacings therebetween become progressively smaller away from the purification portion 9. The water suction ports 23 are also formed on the extensions of the flow passages 22 at the higher part 19 and the step part 20 of the upper wall 12, and a plurality of water suction ports 24 are also formed with spacings therebetween on the side wall 13 of the suction portion 8.

In the purification portion 9, the upper open ends of the side walls 14, 15 and the edge walls 16, 17 are closed by a pair of lids 10 and 11. When the casing 7 is placed on the bottom 1a of the water tank 1, therefore, a filter chamber 25 is defined inside the purification portion 9. The lower part of this filter chamber 25 is connected in common to one of the ends each of the flow passages 22 via a gathering chamber 26 that is defined downwardly of the higher part 19.

A pair of filter materials 5 and 6, that are bent and corrugated inside a horizontal plane, are fitted into the filter chamber 25 of the purification portion 9 and are held in place by frame members 27 and 28, respectively. The filter materials 5 and 6 forming a pair are connected endlessly inside the horizontal plane by a connector 29. In consequence, the filter chamber 25 is divided into a purification chamber 30 inside the filter materials 5 and 6, and a non-purification chamber 31 outside the filter materials 5 and 6.

The lids 10 and 11, the filter materials 5 and 6 and the frame members 27 and 28, as forming pairs, respectively, have exactly the same shape and construction. The filter materials 5 and 6 held by the frame members 27 and 28 are disposed symmetrically with each other inside the filter chamber 25 while being supported by the lids 10 and 11, respectively. This arrangement is employed in consideration of the possibility that the size of the filter 3 will be halved. If the size of the filter 3 becomes half, one each of the lid, the frame member and the filter material may be used in combination. Hereinafter, the description will be made only on one of the lids (10), the filter materials (5) and the frame members (27).

As also shown in FIGS. 4 through 6, the lid 10 is formed in a substantially U-shaped cross-section consisting of a pair of side plates 32 and 33 that oppose each other with a spacing therebetween greater than the distance between both side walls 14 and 15 of the purification portion 9, and of a ceiling plate 34 that connects these side plates 32 and 33 to each other, so that the lid 10 can be fitted to the upper end of the purification portion 9. A support cylinder 35 is suspended from one of the ends of the ceiling plate 34 of this lid 10 so as to communicate with the interior of the purification chamber 30. A plurality of slits 36 extending in the vertical direction are defined on this support cylinder 35 in the circumferentially spaced fashion so that they are expandable to exhibit the force of resilience acting radially inwardly. A plurality of downwardly extending engagement pawls 38 are formed on the side edge of lower surface of the ceiling plate 34. Vertically extending water passage ports 39 are defined on each side plate 32, 33 in a spaced manner.

The frame member 27 consists of an upper support plate 40, a lower support plate 41 and a plurality of connecting rods 42 that connect the upper and lower support plates to each other. The upper support plate 40 has a rectangular shape of a width as fittable into the lid 10. A plurality of fitting holes 43 are formed on the upper support plate 40 so that the engagement pawls 38 described above can be fitted into the holes 43. A fitting cylinder 44, to which the support cylinder 35 described above can be fitted, protrudes integrally from the upper support plate 40. The size of each fitting hole 43 is set to such a level that when the engagement pawl 38 is fitted into the hole 43, the lid 10 and the frame member 27 can be kept connected by the force of friction.

On the other hand, the lower support plate 41 is shaped zigzag except at its both end portions in the longitudinal direction, and a plurality of engagement protuberances 45 are formed at the center in the direction of its width so as to correspond to the valleis of the zigzag shape. Through-holes 46 are formed so as to correspond to the mountains of the zigzag shape. Engagement protuberances 47 are formed on the lower surface of the upper support plate 40 so as to correspond to the engagement protuberances 45 on the lower support plate 41, and the connecting rods 42 of the upper support plate 40 described above correspond to these through-holes 46, respectively. Furthermore, engagement protuberances 45 and 47 are formed on both support plates 40 and 41 at their necessary portions other than the portions described above. Likewise, the connecting rods 42 are also formed at the necessary portions on the upper support plate 40 other than the afore-mentioned portions.

The tip of each connecting rod 42 has a reduced diameter via a step portion 48 so that it can be inserted through each through-hole 46, and engagement protuberances 49 are formed at a position on the reduced diameter portion spaced apart by the thickness of the lower support plate 41 from the step portion 48. Accordingly, when the tip of each connecting rod 42 is inserted through the through-hole 46 of the lower support plate 41, the lower support plate 41 is clamped between the step portion 48 and the engagement protuberance 49, so that both support plates 40 and 41 are connected to each other by the connecting rods 42 to form the frame member 27.

The filter material 5 is molded in a sheet form, and is fitted to the frame member 27 in such a fashion that its outer surface engages with the engagement protuberances 45 and 47 between both support plates 40 and 41, while its inner surface is wound on the connecting rods 42. Accordingly, the filter material 5 is closed at one of its ends on the side of the fitting cylinger 44 with the cylinder 44 facing inward of the material 5, and is open at the other end on the side opposite to the fitting cylinder 44. The filter material 5 is corrugated as a whole. Fitting portions 51, 52, 53 and 54 are integrally disposed on both support plates 40 and 41 at their other end portions opposite to the side of the cylinder 44, and these fitting portions 51–54 have a substantially U-shaped cross-sectional shape. Both end portions of the filter material 5 are fitted to these fitting portions 51–54, thereby keeping open the filter material 5 at the other end portion.

A plurality of inflow ports 55 are formed on the lower support plate 41 of the frame member 27 so that they communicate with the interior of the filter material 5, that is, with the purification chamber 30, when the filter material 5 is fitted. These inflow ports 55 introduce part of the water inside the nonpurification chamber 31 into the purification chamber 30, and thus keeps the permeation speed of the water flowing from the non-purification chamber 31 into the purification chamber 30 through the filter material 5 at an appropriate level. A stopper 56 having a crisscross sectional shape, for example, is integrally disposed at a position at one of the ends of the lower support plate 41 that corresponds to the bottom of the fitting cylinder 44. This stopper 56 prevents the lower end of an elevation pipe 71 of the suction means 4 from being closed by the lower support plate 41 when the elevation pipe 71 is excessively pushed into the purification chamber 30.

The upper support plate 40 of the frame member 27 is fitted into the lid 10 in such a fashion that each engagement pawl 38 fits into each fitting hole 43 and the support cylinder 35 fits into the fitting cylinder 44. On the other hand, an engagement edge 57 capable of engaging with each engagement pawl 38 is disposed at the upper end of the purification portion 9 of the casing 7, which edge 57 projects inwardly and engages with the engagement pawl 38 when the lid 10, to which the frame member 27 is fitted, is fitted to the upper end of the purification portion 9. The force of engagement in this case is set to such a level that when the lid 10 is pulled up manually, the engagement state is released.

A plurality of notches 59 are formed at the upper edge of one 14 of the side walls of the purification portion 9 so as to define water passage holes 60 in cooperation with the upper support plate 40 when the lid 10 is fitted. In other words, the upper part of the filtration chamber 25 communicates with the interior of the water tank 1 through the water passage holes 60 and the water passage holes 39 of the lid 10.

When the lid 10 is fitted to the upper end of the purification portion 9, the filter material 5 that is held in place by the frame member 27 is stored inside the filtration chamber 25, and the tip of each connecting rod 42 which projects downward from the lower support plate 41 comes into contact with the bottom 1a of the water tank 1. Accordingly, the tip of each connecting rod 42 serves also as the leg, and the frame member 27 is housed inside the filtration chamber 25 while floating from the bottom 1a of the water tank 1.

Referring also to FIGS. 7 through 9, a connecting sheet 61 is shown lying between the upper edges of both side walls 14 and 15 of the purification portion 9 at the center of the purification portion 9 in the direction of its width (to the right and left in FIG. 2), and an engagement groove 62 is defined on the lower surface of this connecting sheet 61 so as to extend in a direction crossing at right angles both side walls 14 and 15. Engagement slits 63 and 64 are formed at the lower parts of the side walls 14 and 15, respectively, and these engagement groove 62 and engagement slits 63, 64 together support the connector 29.

Basically, the connector 29 consists of a rectangular frame 65 and a flange 66 disposed integrally around the outer periphery of the former, and the outer periphery of the flange 66 is shaped so as to come into contact with the inner surfaces of both side walls 14, 15, the connecting sheet 61 and the bottom 1a of the water tank 1. Protuberances 67 and 68, for engagement with the engagement slits 63 and 64, respectively, are formed on this flange 66, and a communication port 69 is formed in the flange so as not to divide the filtration chamber 25 by the connector 29. Furthermore, the upper edge of the flange 66 is fitted into the engagement groove 62, and a notch recess 70 is defined at the lower edge of the flange 66 so as to communicate both filtration chambers 25 on both sides of the connector 29.

The connector 29 connects the open ends of a pair of filter materials 5 and 6 so that the filter materials 5 and 6 are connected endlessly to each other. Moreover, these filter materials 5 and 6 are disposed over the entire length of the communication port 50 inside the filtration chamber 25, that is, between both ends in the direction of disposition of the flow passages 22 in the suction portion 8.

Returning again to FIG. 3, the water suction means 4 consists of the elevation pipe 71 extending vertically, a discharge pipe 72 connected to the upper end of the elevation pipe 71, a compressed air source 73 such as a small compressor, an air feed pipe 74 such as a vinyl tube having one of its ends connected to the compressed air source and inserted into the elevation pipe 71 through the discharge pipe 72, and a cylindrical bottomed air jet cylinder 75 fixed to the other end of the air feed pipe 74 in the proximity of the lower end of the elevation pipe 71.

The elevation pipe 71 is fitted into the support cylinder 35 of the lid 10 so as to project into the purification chamber 30, and its upper edge is disposed at a position somewhat below the water level 1 inside the water tank 1. Moreover, the elevation pipe 71 has an outer diameter which is a little greater than the inner diameter of the support cylinder 35 under its natural state. When fitted into the support cylinder 35, the elevation pipe 71 expands the support cylinder 35 by the operation of the slit 36, so that the support cylinder is fixedly held by the force of resilience acting inward in the radial direction of the support cylinder 35. The discharge pipe 72 is molded and bent substantially in an L-shape, and is inserted into the upper edge of the elevation pipe 71 while its discharge port 76 is positioned at substantially the same level as the water level 1. The air jet cylinder 75 is made of an air-permeable material such as foamed synthetic resin, and the compressed air is jetted in the form of fine bubbles from this air jet cylinder 75 into the elevation pipe 71. The air bubbles rise inside the elevation pipe 71.

The water suction means 4 may be disposed on only one side of the purification portion 9 as in this embodiment, or on both sides of the purification portion 9. When the water suction means 4 is disposed on only one side, however, the support cylinder on the other lid 6 is closed by a cap 77 shown in FIGS. 1 and 2.

Next, the operation of this embodiment will be described. When the water suction means 4 operates, that is, when the compressed air is supplied from the compressed air source 73 into the air jet cylinder 75 through the air feed pipe 74, a large number of air bubbles occur at the lower end inside the elevation pipe 71, and then rise inside the elevation pipe 71 so that a rising flow of the water occurs inside the elevation pipe 71. Accordingly, a negative pressure develops inside the purification chamber 30, and the water is sucked into the filter 3 through the pebbles 2 due to the pressure difference between this negative pressure and the water pressure at the lower part inside the water tank 1. In other words, the water passing through the pebbles 2 is filtrated by the filter operation of the pebbles 2, then flows into each flow passage 22 of the suction portion 8 through each suction port 23, 24, and is thereafter introduced into the non-purification chamber 31 from each flow passage 22 through the gathering chamber 26. The water is also sucked from inside the water tank 1 into this non-purification chamber 31 at its upper portion through the passage holes 39, 60. The sucked water partially flows into the purification chamber 30 through the inflow ports 55, while the rest passes through, and is filtrated by, the filter materials 5 and 6 and is thereafter fed into the purification chamber 30. In this manner, the water inside the water tank 1 is primarily filtrated by the pebbles 2, and part of the water is further filtrated secondarily by the filter materials 5 and 6 and is then fed back into the water tank 1.

In this filter 3, the interior of the purification chamber 30 defined by the filter materials 5 and 6 and both support plates 40 and 41 is kept at substantially the same negative pressure, and moreover, the purification chamber 30 is disposed so as to lie between the two outermost flow passages 22. Accordingly, the negative pressure inside each flow passage 22 remains substantially at the same pressure level. In addition, the spacings between the water suction ports 23 become progressively smaller away from the purification chamber 30, so that the negative pressure on the upper surface of the suction port 8 is kept substantially uniform throughout the entire front of the suction portion 8. In consequence, the velocity of flow of water passing through the pebbles 2 becomes substantially uniform throughout the range of its passage. Accordingly, the water promotes the propagation of chlorella and aerobic microorganisms. These microorganisms decompose organic matters such as residual bait and droppings of fish to prevent clogging of gaps among the pebbles 2. Moreover, chlorella and the like can be used as living bait for fish.

Inside the filtration chamber 25, part of the water inside the non-purification chamber 31 flows into the purification chamber 30 through the inflow ports 55, so that the flow velocity of the water passing through the filter materials 5 and 6 can be kept at a suitable level, and the propagation of the aerobic microorganisms described above can be promoted. Moreover, the filter materials 5 and 6 are corrugated and extended in the vertical direction, so that the filtration area can be increased relatively within a limited space, and the filtration efficiency can be improved. It is also possible to prevent the air bubbles from staying on the outer surfaces of the filter materials 5 and 6 and from impeding the flow of water through the materials.

The filter materials 5 and 6 may be clogged in the course of long-time use of the filter. In such a case, the filter materials 5 and 6 can be removed from inside the filtration chamber 25 by removing the lids 10 and 11 from the purification portion 9 because the filter materials 5 and 6 are supported by these lids 10 and 11 via the frame members 27 and 28. Clogging can be eliminated easily by removing the filter materials 5 and 6 from the frame members 27 and 28 and then washing the filter materials. Thereafter, filtration can be made once again by fitting again the filter materials 5 and 6 to the respective frame members 27 and 28, and then fitting the members 27 and 28 to the purification portion 9 together with the lids 10 and 11.

In the embodiment described above, two pairs of lids 10 and 11, frame members 27 and 28 and filter materials 5 and 6 are employed, but one pair each can of course be disposed inside the purification portion 9. In this case, however, a single filter material is connected endlessly inside a horizontal plane. It is also possible to bury the purification portion 9 into the pebbles 2, and the interior of the suction portion 8 need not be divided into a plurality of flow passages 22 by the separator 21.

The embodiment described above deals with a filter which is adapted further to filtrate the water, that has been filtrated by the pebbles, by filter materials. The following embodiment includes a filter in which filtration by the pebbles and filtration by the filter materials are carried out parallel.

FIGS. 10 through 19 illustrate another embodiment of the present invention. Suction portions 84 and 85 are removably fitted to the upper and lower parts of a purification portion 83 of a casing 81 of filter 3', and water suction ports 86 and 87 are formed on each suction portion 84, 85. Moreover, the casing 81 is disposed inside the water tank 1 with its lower half being buried in the pebbles 2.

The purification portion 83 has a substantially rectangular cross-section. Sheet-like compact filter materials 80 made of a synthetic resin or the like are arranged cylindrically along the front and rear surfaces 83a, 83b of the purification portion 83 inside a filtration chamber 88 that is defined in the purification portion 83, and a non-purification chamber 89 and a purification chamber 90 are defined on the inner and outer sides of the filter materials 80, respectively.

Figure 15:
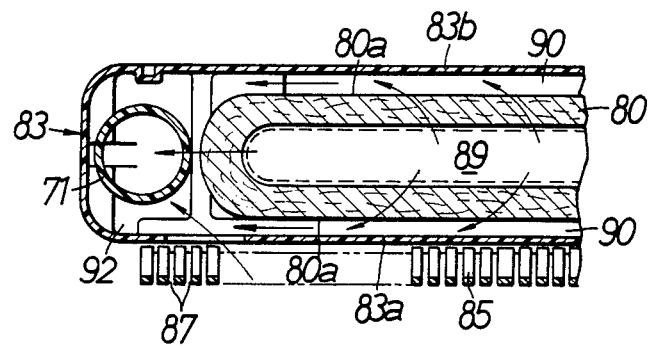
Figure 16:
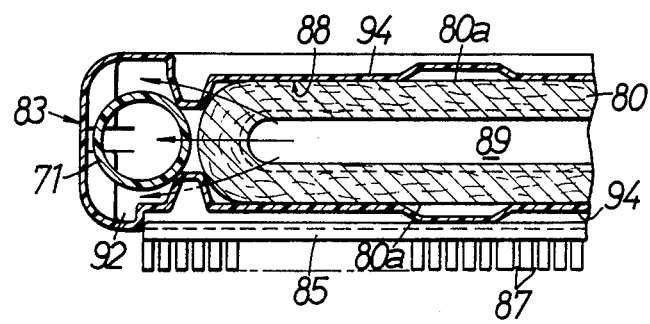
Figure 17:
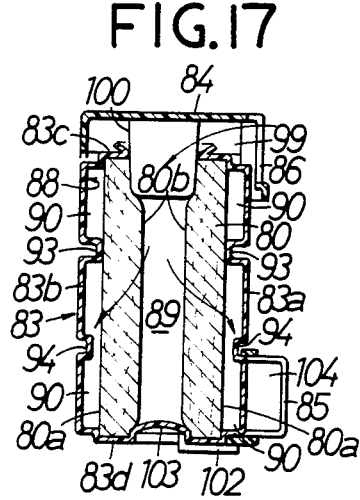
Figure 18:
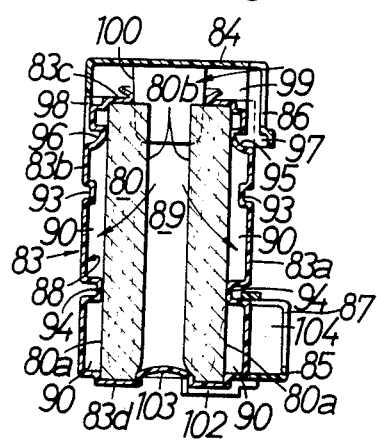
Figure 19:
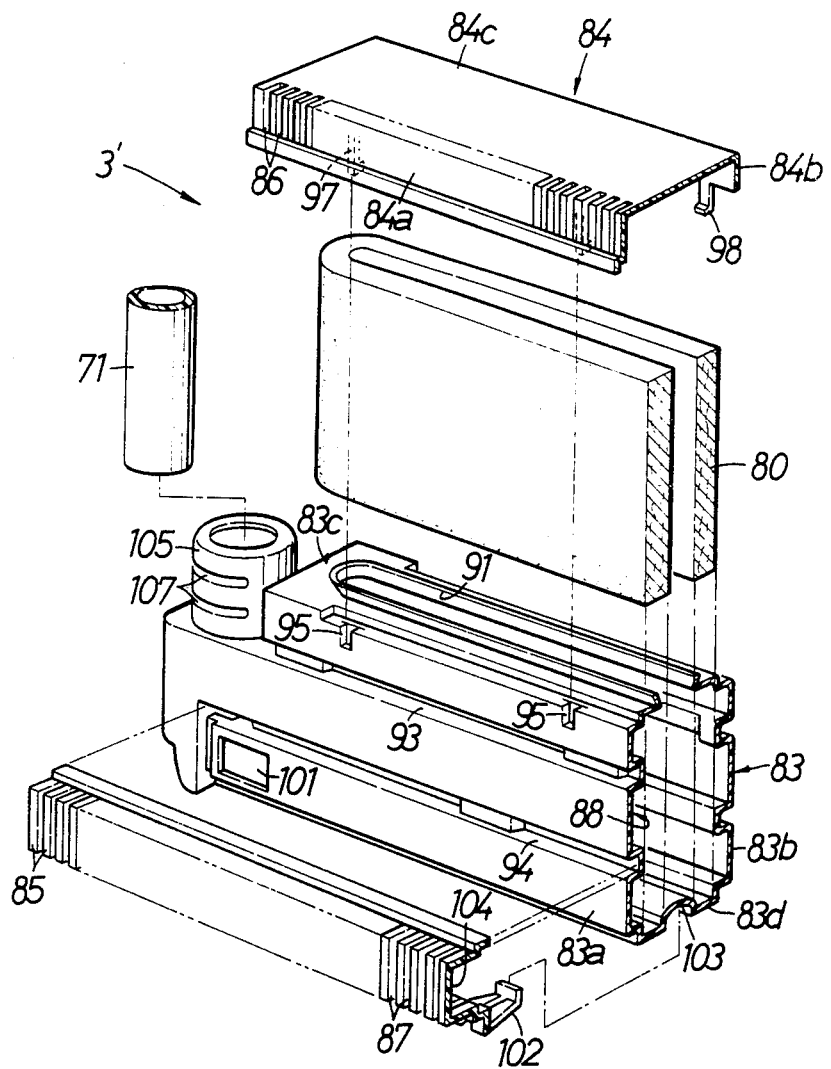

The non-purification chamber 89 communicates with two through-holes 91, 91 opened on the upper surface 83c of the purification portion 83, and the purification chamber 90 is defined between the front and rear surfaces 83a, 83b of the purification portion 83 and the outer peripheral surface 80a of the filter material 80, respectively, and communicates with discharge chambers 92, 92 formed at both ends of the purification portion 83, as shown in FIG. 15.

Upper and lower spacer/reinforcing ribs 93 and 94 are formed on the front and rear surfaces of the purification portion 83 in such a manner as to extend transversely with a spacing therebetween in the vertical direction, respectively. These ribs come into contact with the outer peripheral surface 80a of the filter material 80, thereby separating the outer peripheral surface 80a from the front and rear surfaces 83a and 83b, and defining the purification chamber 90 described above between them.

Elongated through-holes 91 and 91 are formed in the upper surface 83c of the purification portion 83 and extend from both ends of the upper surface 83c to its center. These through-holes 91, 91 are covered by the suction portion 84 that is detachably fitted to the upper surface 83c. A plurality of engagement grooves 95 and 96 are defined at the upper parts of the front and rear surfaces 83a, 83b of the purification portion 83 in the spaced-apart relation. A plurality of vertically extending engagement pieces 97 are formed integrally inside the front surface 84a of the suction portion 84 so as to correspond to the engagement grooves 95 described above, respectively, and a plurality of engagement pieces 98 project integrally from the lower edge of the rear surface 84b of the suction portion 84 so as to correspond to the engagement grooves 96 described above. When these engagement plates 97 and 98 are engaged with the upper engagement grooves 95 and 96, respectively, the suction portion 84 can be removably fitted to the upper surface of the purification portion 83.

Upper water suction ports 86 formed as a large number of slits are provided on the front surface of the suction portion 84 over its entire length, and upper inflow passage 99 communicating with the through-holes 91, 91 of the upper surfaces 83c of the purification portion 83 are formed inside the suction portion 84.

A plurality of spacers 100 as frame members, which extend downward with spacings between them, are disposed on the upper surface 84c of the suction portion 84, and are inserted between the opposed inner surfaces 80b and 80b of the sheet-like filter material 80 that is disposed inside the filtration chamber 88 from the through-holes 91, 91 of the upper surface 83c of the purification portion 83, thereby forming predetermined gaps between the opposed inner surfaces 80b and 80b.

Through-holes 101, 101 are formed at the lower part and on both sides of the front surface 83a of the purification portion 83, and the suction portion 85 is fitted in such a manner as to cover these through-holes 101, 101. The suction portion 85 has a U-shaped cross-section, and extends substantially over the entire length at the lower part of the front surface 83a of the purification portion 83. The upper edge of the suction portion 85 is fitted into the lower spacer/reinforcing ribs 94 that are defined on the front surface 83a of the purification portion 83, and several engagement pawls 102 formed integrally at the lower edge of the suction portion 85 are engaged with engagement grooves 103 that are defined substantially over the entire length of the bottom 83d of the purification portion 83. Thus, the suction portion 85 can be removably fitted to the purification portion 83. Lower inflow ports 87 formed as a large number of slits are provided over the entire length of the suction portion 85, and lower inflow passage 104 communicating with the through-holes 101, 101 of the front surface 83a of the purification portion 83 is defined over the entire length of, and inside, the suction portion 85.

Water suction pipe fitting portions 105, 105, which have a short cylindrical shape and whose upper ends are open, are formed integrally on the upper surface of the discharge chambers 92, 92 at both ends of the suction portion 83. One (on the right in FIG. 10) of these water suction pipe fitting portions 105 is closed by a cap 106, while the base end of the elevation pipe 71 is removably inserted into the other (on the left in FIG. 10), so that the pipe 71 is fixed and supported due to frictional engagement by two reinforcing/support ribs 107 that are defined on each of the fixed and rear side surfaces of the fitting portion 105.

In the drawings, reference numeral 108 represents suction disc for fixing the casing 81 inside the water tank 1.

Figure 10:
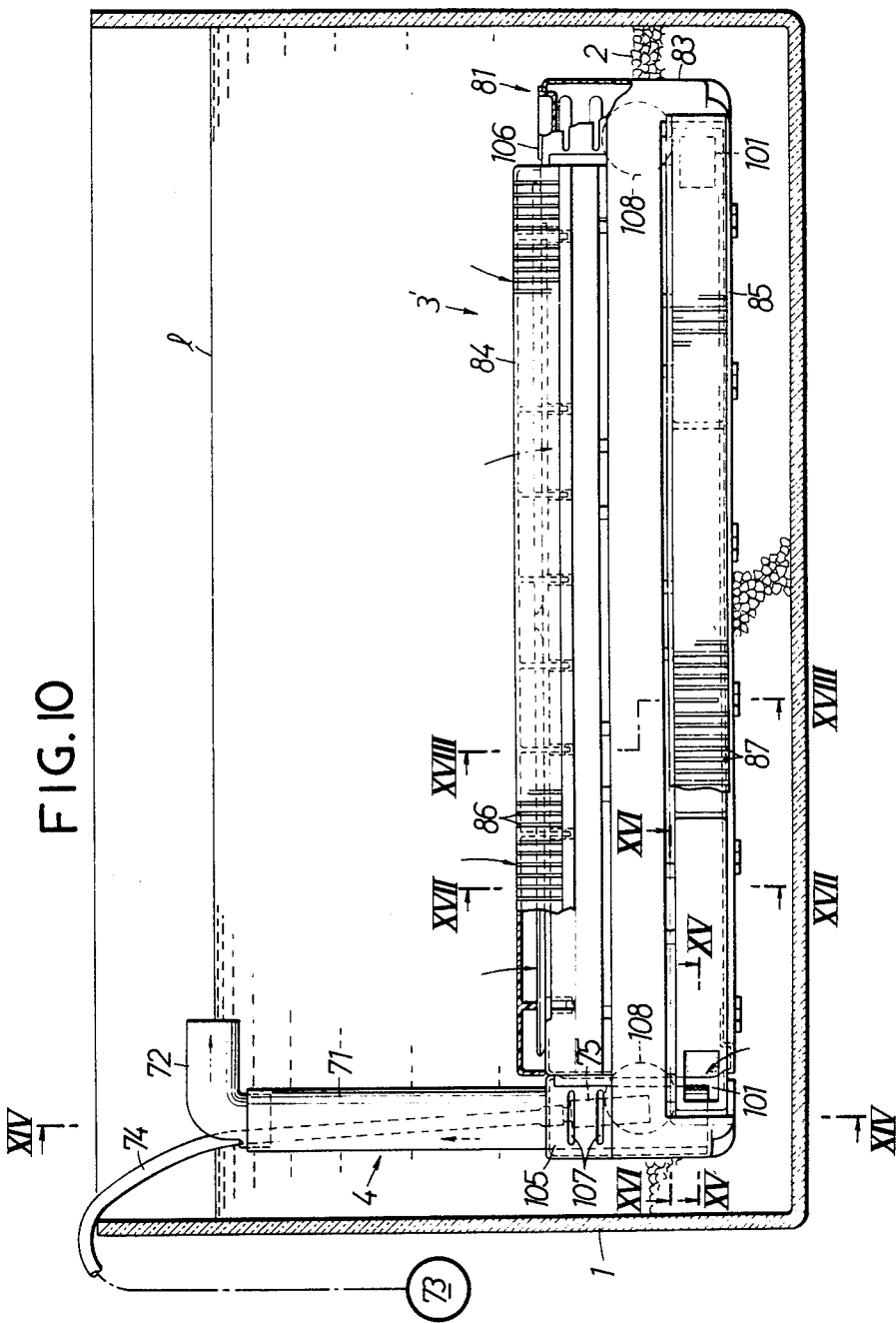
Figure 14:
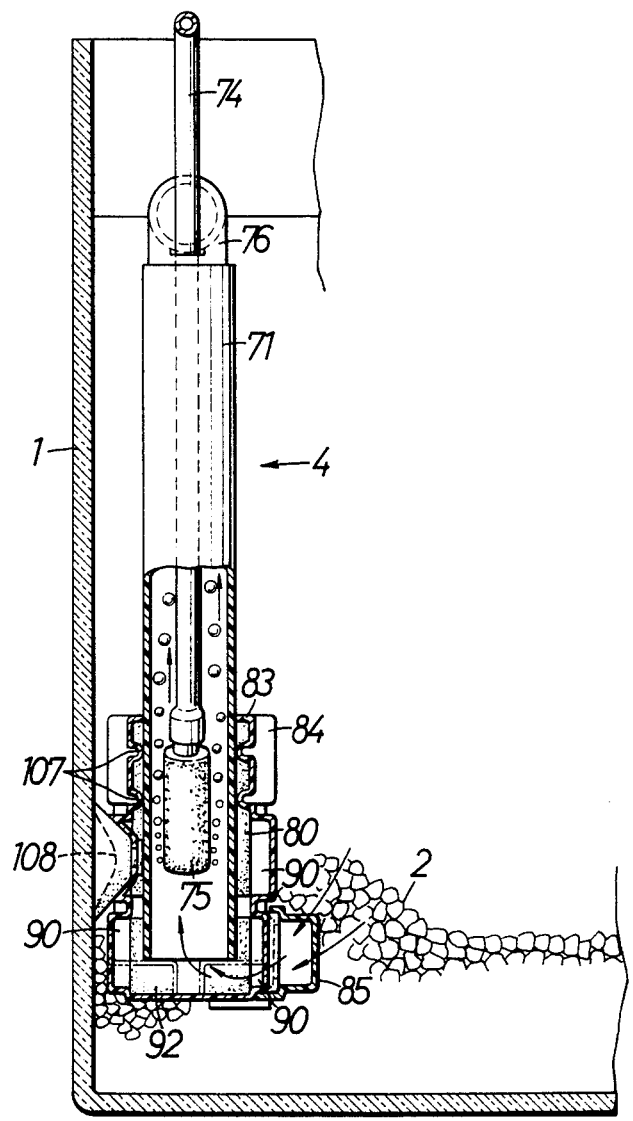

Next, the operation of this embodiment will be described. First, the filter 3' of the invention having the construction described above is placed inside the water tank 1 as shown in FIG. 10 so that the lower suction portion 85 of the filter case is completely buried in the pebbles 2 spread on the bottom surface of the water tank 1. Then, the rear surface 83b of the purification portion 83 is fixed to the back inside the water case 1 by the suction discs 108, 108. Next, the compressed air source 73 is driven to jet the air into the elevation pipe 71 from the air jet cylinder 75 at the tip of the air feed pipe 74 and thereby to generate an elevating air flow. The water inside the elevation pipe 71 is raised and is jetted from the discharge pipe 72 at its tip into the water tank 1.

In this case, the water suction force develops inside the elevation pipe 71, and part of the contaminated water containing the residual bait and droppings of fishes inside the water tank 1 is introduced from the upper suction port 86 on the front surface of the upper suction portion 84 into the non-purification chamber 89 inside the filter material 80, that is disposed in the filtration chamber 88, through the upper inflow passage 99 and the through-holes 91, 91 of the upper surface 83c of the purification portion 83. After passing through and being filtrated by the filter material 80, the part of contaminated water flows as the purified water into the purification chamber 90 and then into the discharge chamber 92 at one end (extreme left in FIG. 10) of the purification portion 83.

The other part of the contaminated water inside the water tank 1 passes through the pebbles 2 spread on the bottom of the water tank 1, and after the solid matters such as the residual bait and droppings of fishes are filtrated, the water flows into the lower inflow passage 104 from the lower suction port 87 on the front surface of the suction portion 85 buried in the pebbles 2, from thence into the purification chamber 90 through the through-holes 101, 101 and thereafter joins with the purified water that is filtrated by the filter material 80. Both flows of water are gathered in the discharge chamber 92.

The purified water thus gathered in the discharge chamber 92 is sucked into the elevation pipe 71 from the lower end thereof, and is then pushed up inside the elevation pipe 71 by the air stream jetted from the air jet cylinder 75 as described already, the water thereafter being returned as the purified water from the discharge pipe 72 at the tip thereof into the water tank 1.

As is obvious from the foregoing description, the flows of water inside the water tank 1 consists of the first water flow which flows from the upper suction ports 86 of the suction portion 84 into the discharge chamber 92 through the filter material 80 inside the filtration chamber 88, and the second water flow which passes through the pebbles at the tank bottom and directly flows into the discharge chamber 92 from the lower suction port 87 of the suction portion 85. Since the compact filter material 80 made of a synthetic resin or the like has greater flow resistance of water than the pebbles as the coarse filter material, the first water flow has a sufficiently smaller velocity than the second water flow. Accordingly, it promotes the propagation of useful microorganisms such as chlorella and aerobic bacteria which decompose organic matters inside the filter material 80 in the filtration chamber 88, so that these microorganisms can decompose the organic matters such as the residual bait and droppings of fish attaching to the filter material 80 and prevent clogging of the filter material 80. Bacteria such as chlorella can be used as the living bait of fish. Even if the filter material 80 gets clogged in the course of long-time use of the filter, the water flow from the non-purification chamber 89 inside the filtration chamber 88 to the purification chamber 90 never stops because the water inside the water tank 1 always flows into the discharge chamber 92 through the purification chamber 90 inside the filtration chamber 88 from the lower suction port 87 through the pebbles having low flow resistance, thereby causing always the water suction force. For this reason, high filtration effect can be kept for an extended period of time by the filter material 80 and at the same time, acidemia of fish due to the shortage of oxygen fed into water does not happen.

What is claimed is:

1. In a filter of the type in which at least part of a casing is buried together with its suction ports in pebbled spread inside a water tank in order to let said pebbles exhibit a filter operation, and suction means is connected to said casing, the improvement wherein said casing consists of a suction portion buried in said pebbles together with suction ports thereof, and a purification portion connected to said suction portion and having an upper part thereof closed by a detachable lid; said filter further comprises a filter material dividing said purification portion into a purification chamber and a non-purification chamber and a frame member removably fitted into said purification portion holding said filter material; said suction means is supported by said lid in such a manner as to face the interior of said purification chamber; and a water flow path is provided in said casing for introducing water directly into said purification chamber of the purification portion while bypassing said filter material.

2. A filter as defined in claim 1, wherein said suction portion has a large surface facing said pebbles spread therreover, said surface being provided with a plurality of water suction ports with intervals therebetween, said intervals being set smaller as distanced farther away from said suction means.

3. A filter as defined in claim 1, wherein said filter material is removable from the casing by taking out the frame member from the casing after detaching the lid.

4. A filter as defined in claim 1, wherein said water flow path comprises a plurality of inflow ports formed on said frame member.

5. A filter as defined in claim 1, further comprising a second suction portion located above said pebbles and directly facing the water in the tank, wherein said water flow path comprises an inflow passage defined in the first mentioned suction portion along an entire length of the portion and a through-hole formed on the purification portion and communicating with said inflow passage.

6. A filter as defined in claim 1, further comprising another water flow path for directly introducing the water in the tank into said non-purification chamber.

* * * * *